United States Patent [19]
Siano

[11] Patent Number: 5,164,140
[45] Date of Patent: Nov. 17, 1992

[54] PROCESS FOR LINES PANELS

[75] Inventor: Dante Siano, Cologno Monzese, Italy

[73] Assignee: Commer S.p.A., Milan, Italy

[21] Appl. No.: 534,900

[22] Filed: Jun. 8, 1990

[30] Foreign Application Priority Data

Jun. 9, 1989 [IT] Italy ............... 20840 A/89

[51] Int. Cl.⁵ .............................................. B28B 7/22
[52] U.S. Cl. ............................ 265/255; 156/245;
    264/250; 264/257; 425/398; 425/412
[58] Field of Search ............ 425/397, 400, 412, 398,
    425/DIG. 48; 264/324, 257, 258, 248, 249, 250,
    255, 266; 156/245, 285

[56] References Cited
U.S. PATENT DOCUMENTS

| | | | |
|---|---|---|---|
| 3,083,734 | 4/1963 | Taplin | 264/324 |
| 3,377,348 | 4/1968 | Subocz | 264/249 |
| 4,221,556 | 9/1980 | Kiss | 425/398 |
| 4,243,456 | 1/1981 | Cesano | 264/163 |
| 4,378,265 | 3/1983 | Kiss | 264/119 |
| 4,469,655 | 9/1984 | Kiss | 264/324 |
| 4,534,725 | 8/1985 | Hemmelgarn et al. | 425/397 |
| 4,830,599 | 5/1989 | Okusaku et al. | 425/408 |
| 4,923,539 | 5/1990 | Spengler et al. | 156/245 |
| 4,961,700 | 10/1990 | Dunbar | 425/400 |
| 5,073,318 | 12/1991 | Rohrlach et al. | 264/255 |

FOREIGN PATENT DOCUMENTS

| | | | |
|---|---|---|---|
| 59-187680 | 10/1984 | Japan | 264/257 |
| 61-179363 | 8/1986 | Japan | 425/398 |

*Primary Examiner*—Jay H. Woo
*Assistant Examiner*—Robert B. Davis
*Attorney, Agent, or Firm*—Millen, White, Zelano and Branigan

[57] ABSTRACT

A process for the manufacture of panels, wherein a superficial covering including at least one fabric portion is surrounded by an adjacent portion of plastic material, wherein the covering is coupled by molding to a plate of heated thermoplastic material, simultaneously with the shaping of the plate. The process brings a considerable area of the fabric portion into contact with the heated plate before coupling of the whole covering by utilizing at least one pressing element such as a dandy roll, or similar movable piece of the die, positioned in correspondence with the corresponding fabric portion.

8 Claims, 1 Drawing Sheet

PROCESS FOR LINES PANELS

BACKGROUND OF THE INVENTION

1. Field of the Invention

The present invention concerns a process and a die for the manufacture of lined panels for the trimming of interiors of motor vehicles in general. The covering for motor vehicles interiors is normally obtained by using lined panels generally consisting of a supporting plate made of thermoplastic material coupled with a covering. Said covering is usually constituted by areas of fabric placed adjacent to areas of calendered plastic, or imitation leather, along junction lines and/or superimposition lines. The arrangement of the fabric portions varies according to the panel required. In particular, the fabric portion may be placed inside the imitation leather portion, thus forming a so-called "medallion", i.e. an area of fabric completely surrounded by the calendered plastic portion of the covering, or, alternatively, it may extend from the junction line with the imitation leather portion as far as the edges of the panel itself. In the first case the junction and/or superimposition line is closed on itself, in the second case it is an open line.

2. Description of the Prior Art

The die to produce lined panels is usually formed by two half-dies shaped in a complementary way according to the desired profile of the panel. During molding a preheated supporting plate is positioned on the lower half-die, then the upper half-die is closed bringing the covering, previously stretched on a positioning frame, in contact with the heated plate, thus fixing the covering onto the plate simultaneously with the panel shaping operation.

The main problem of this coupling technique by molding with simultaneous shaping involves the need of exactly positioning the covering with respect to the panel.

In fact the different portions of the covering, i.e. fabric and imitation leather, must occupy predetermined areas on the finished panel, and just on said areas they have to be exactly positioned during molding not to negatively affect the final aesthetics of the panel.

Moreover, in case it is foreseen to manufacture a panel presenting the so-called shadow effect, namely a panel in which said junction and/or superimposition line is housed inside appropriate slots provided during molding on the supporting plate, the positioning of said junction line and therefore of the covering areas with respect to the die must be even more precise. In fact an uncorrect position of the junction and/or superimposition line with respect to the slot would much more negatively affect the final aesthetics of the panel than in the previous case.

To ensure the necessary exact positioning of the single portions of covering, the normally used techniques foresee, for example, pressing members such as dandy rolls or similar pieces of die movable with respect to the half-die housing them. Said members may be present on one or both the half-dies and are generally provided in correspondence with the junction and/or superimposition lines of the covering, in a way that, at the beginning of the molding stage, they bring said lines in contact with the supporting plate, before the panel final molding.

The use of such pressing members, however, involves problems due to the fact that, by engraving the softened supporting plate, they cause thinnnings on it which sometimes may be considerable as to cause the final panel to be rejected.

OBJECTS OF THE INVENTION

An object of the present invention is therefore to overcome the abovesaid inconvenience of the known technique, and in particular to provide a process and a die allowing an exact positioning of the covering on the plate, namely with respect to the shaping of the plate itself, without jeopardizing the final consistency of the panel.

SUMMARY OF THE INVENTION

Said object is achieved by means of a process for manufacturing lined panels, of the type in which a superficial covering consisting of one or more fabric portions adjacent to at least one portion of calendered plastic material, along one or more junction and/or superimposition lines, is coupled by molding with a plate of heated thermoplastic material simultaneously with the shaping of said plate, characterized by the fact of bringing at least a considerable area of said fabric portion in contact with said heated plate, before the coupling of the whole covering, by means of at least one corresponding pressing member such a dandy roll or similar movable piece of the die. The invention furthermore concerns a die to produce lined panels by shaping and simultaneously coupling a supporting plate of heated thermoplastic material with a superficial covering consisting of one or more fabric portions adjacent to at least one portion of calendered plastic material along one or more junction and/or superimposition lines, of the type in which a pressing member is provided, such a dandy roll or similar movable piece of the die, characterized in that said one or more pressing members are provided in biunivocal correspondence with said one or more fabric portions and have an extension and a shape corresponding at least to a considerable area of the corresponding fabric portion.

The present invention has the advantage of preventing the plate excessive thinning in correspondence with the area engaged by the pressing members, distributing the stress on a much more extended area than it occurs according to the known technique. Preferably the extension and configuration of said area correspond to those of the fabric covering.

BRIEF DESCRIPTION OF THE DRAWINGS

The invention will be now further described with particular reference to an exemplifying non-limiting embodiment, illustrated in the accompanying drawings, in which.

DESCRIPTION OF THE PREFERRED EMBODIMENT

Figure 1:
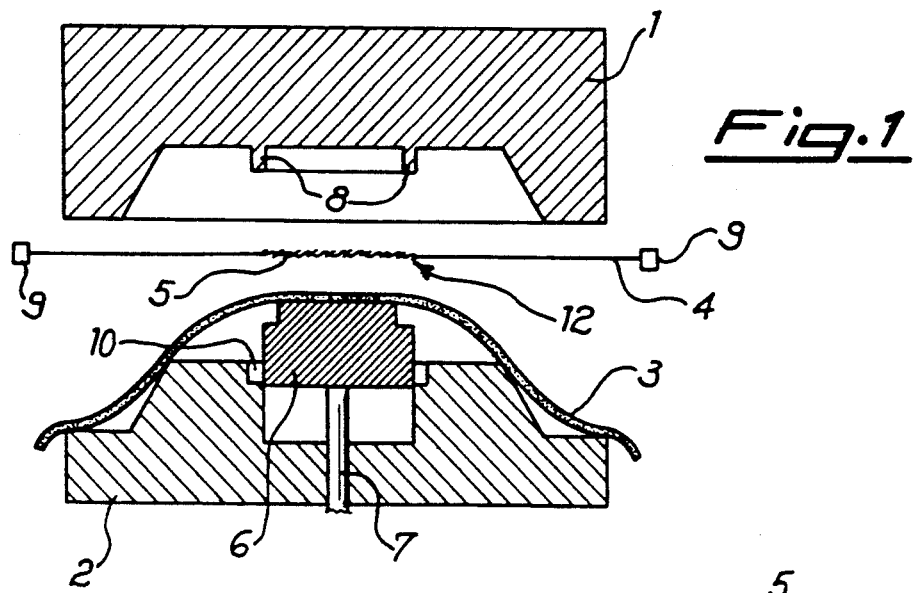
FIG. 1 is a cross-section of the die in an open position.

With reference first of all to FIG. 1, between half-dies 1 and 2 there are positioned a preheated supporting plate 3 and a mixed covering of plastic material 4 and of fabric 5, stretched on a positioning frame 9.

According to the principle of the invention, in correspondence with the fabric areas there are provided, housed inside one or both half-dies, pressing members such as for example dandy rolls, which, while the die closes, bring at least one considerable area of the fabric portion 5 of the covering in contact with the supporting plate 3, before the coupling of the whole covering with the heated plate, thus ensuring the exact positioning of the covering on the plate itself.

The disposition of said pressing members is in bi-univocal correspondence with the fabric portions; in fact said dandy rolls present an extension and a configuration substantially corresponding to those of said considerable areas of the fabric portion.

In the present specification "considerable area" means a sufficiently extended area of the fabric portion such as to ensure a distribution of stresses capable of excluding any substantial thinning of the plate in correspondence with the pressing member.

Preferably said areas will extend towards the inside of the fabric portion of the covering, starting from said junction and/or superimposition line with the adjacent imitation leather portion; said line will therefore correspond also to the profile of the peripheral edge of the corresponding pressing member or to part of said profile. As it can be better seen in FIG. 4, in the preferred embodiment according to the invention, illustrated in FIGS. 1-4, the fabric portion 5 of the covering is completely surrounded by the calendered plastic portion 4, thus forming a so-called medallion on the covering, in which said junction and/or superimposition line is closed on itself. In this case, the dandy roll corresponding to the fabric portion of the covering has an extension and a shape which are substantially the same as those of said portion.

Figure 2:
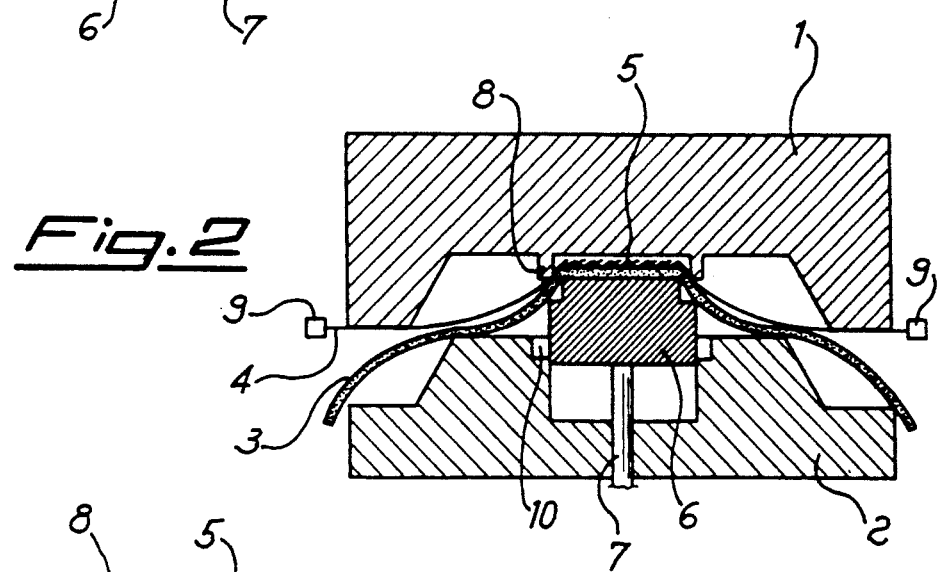
FIG. 2 is a cross-section of the die in an intermediate position.

Now, with reference to FIG. 2, it can actually be noticed that in the lower half-die 2 there is provided, in a position of biunivocal correspondence with the fabric portion 5 of the covering, a pressing member, such as a dandy roll or the like, vertically movable with respect to the half-die housing it, and projecting from the latter thanks to a rod 7.

Since, as mentioned above, the dandy roll 6 has an extension and configuration substantially identical to those of the portion 5, during the die closure (FIG. 2) the dandy roll 6 brings a similar area of plate 3 to abut on the fabric portion 5 of the covering, before the coupling of the whole covering with the plate 3.

Figure 3:
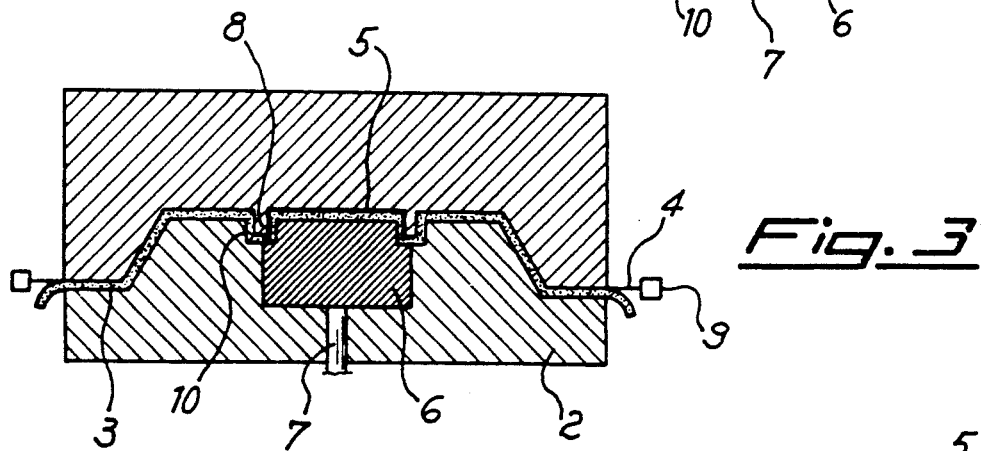
FIG. 3 is a cross-section of the die in closed position.
Figure 4:
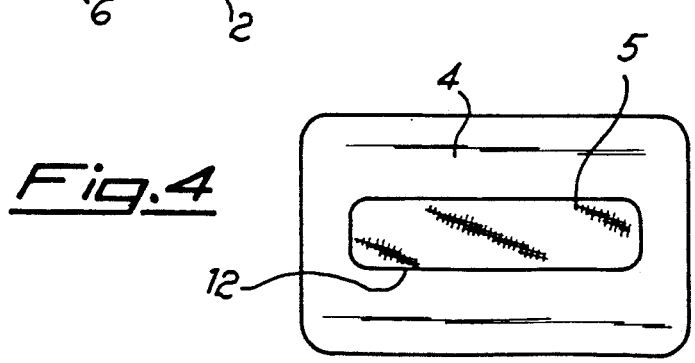
FIG. 4 is a view from the top of a molded and shaped panel.

In FIG. 3, the pressing member 6 is completely housed in its seat and the die is completely closed, thus coupling the covering with the plate simultaneously with their shaping.

It is clear that, with reference to the accompanying drawings, the position of the dandy roll simply illustrates a particular embodiment of the invention; in fact, the dandy roll may be present in the lower half-die only, or, alternatively, there may be provided two pressing members, one of which acting on the supporting plate 3 and the other on the fabric portion 5, both operating as previously described. Said dandy rolls may insist on the same portion of panel or on complementary portions.

In the preferred embodiment of FIGS. 1-4, the die used is provided with means to obtain the abovementioned shadow effect. In particular, grooves 10 are present on the half-die 2 and are positioned in correspondence with the position that said junction and/or superimposition line 12 between fabric 5 and imitation leather 4 must take on the shaped panel. In correspondence with the grooves 10 on the half-die 1 there are provided the complementary projecting portions 8, i.e. those portions capable of partially occupying said grooves 10 to form in the finished panel the slots where the junction and/or superimposition line 12 will be housed.

As it can be noticed the grooves 10 are provided in a complementary way on the fixed portion of said half-die as well as on the pressing member 6 housed in it, so that the peripheral edge of said element 6 correesponds to the perimeter of the slot 10. In particular, in the preferred embodiment of FIGS. 1-3, the groove 10 is half on the fixed portion of the lower half-die and half on said peripheral edge of the pressing member 6, namely on the edge formed by the vertical walls of the member 6 and the surface of said member insisting on the plate. In this way, during molding, once the dandy roll is completely housed in the half-die 2, the groove 10 forms and is ready to receive partially said projecting complementary portions 8 provided on the half-die 1.

On the contrary, in case the junction and/or superimposition line is an open line, that is in case the fabric portion of the covering extends as far as the panel edges, the groove 10 will concern only part of the peripheral edge of the pressing member.

The device according to the present invention operates in the following way: during the die closure, the dandy roll 6 projecting from the lower half-die brings part of the supporting plate 3 to engage the fabric covering 5 (FIG. 2) thus fixing them to each other before the coupling of the whole covering with the plate.

Furthermore, in this position, the projecting portions 8 cooperate with the groove section provided in the peripheral edge of the pressing member 6 to position in an univocal way the covering 5 with respect to the plate and the die.

When the upper half-die meets the lower half-die, the pressing member 6 is completely housed in its seat, the projecting portions 8 are positioned inside the slot 10 formed between the dandy roll 6 and the lower half-die 2 and the remaining portion of the covering is fixed to the supporting plate 3.

The particular configuration of the dandy roll, substantially identical to that of the fabric portion, allows during molding an optimal distribution of the stresses on the supporting plate, thus overcoming all the problems of the known art related to the use of dandy rolls, though allowing an optimal positioning of the covering to be achieved.

I claim:

1. A process for the manufacture of lined panels by pressing layers of material between upper and lower portions of a die, comprising the steps of:
    (a) positioning on the lower portion of the die, a thermoplastic plate which is heated;
    (b) positioning a cover sheet composed of laterally adjacent and distinct fabric and plastic portions with the plastic portion at least partially surrounding the fabric portion over the thermoplastic plate;
    (c) contacting and coupling the entire area of the fabric portion with the thermoplastic plate by pressing only the fabric portion into contact with the plate with a pressing member having a shape and extension substantially similar to the fabric portion; and
    (d) subsequent to step (c) coupling that portion of the cover sheet with the thermoplastic plate which was not coupled in step (c) while simultaneously shaping the panel.

2. A process according to claim 1, wherein the pressing member is mounted in a fixed portion in the lower portion of the die.

3. A process according to claim 1, wherein the fabric portion is completely surrounded by the plastic portion, and wherein the pressing member has a shape and extension identical to that of the fabric portion.

4. A process according to claim 2, wherein, during panel molding, grooves present in the fixed portion of the lower portion of the die cooperate with corresponding projections on the upper portion of the die to provide in the panel a slot at a juncture between the fabric and plastic portions, and wherein the pressing member has grooves in correspondence with a peripheral edge thereof and is used together with the grooves in the fixed portion of the die to create the slot in the shaped panel.

5. A process according to claim 4, wherein the grooves are located half in the fixed portion of the die and half in the peripheral edge of the pressing member.

6. The process of claim 1, wherein the plastic portion is imitation leather.

7. The process of claim 1, wherein the plastic portion is calendered plastic.

8. The process of claim 1, wherein there are a plurality of plastic portions.

* * * * *

UNITED STATES PATENT AND TRADEMARK OFFICE
CERTIFICATE OF CORRECTION

PATENT NO. : 5,164,140
DATED : November 17, 1992
INVENTOR(S) : Dante SIANO It is certified that error appears in the above-identified patent and that said Letters Patent is hereby corrected as shown below:

On the title page
IN THE TITLE: Item [54]:

Change Lines to --Lined--

Signed and Sealed this

Twelfth Day of October, 1993

BRUCE LEHMAN

*Attest:*

*Attesting Officer*  *Commissioner of Patents and Trademarks*